UNITED STATES PATENT OFFICE.

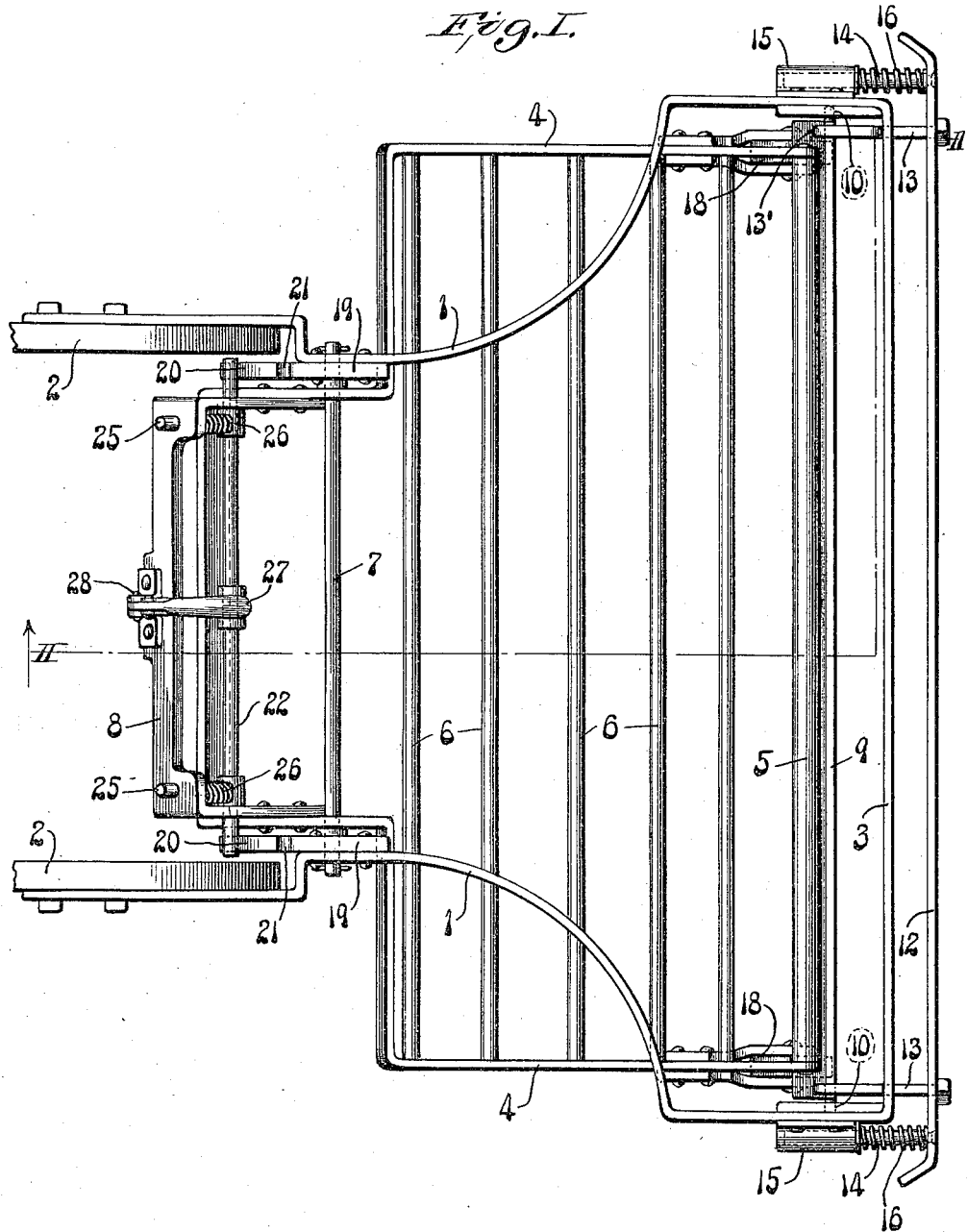

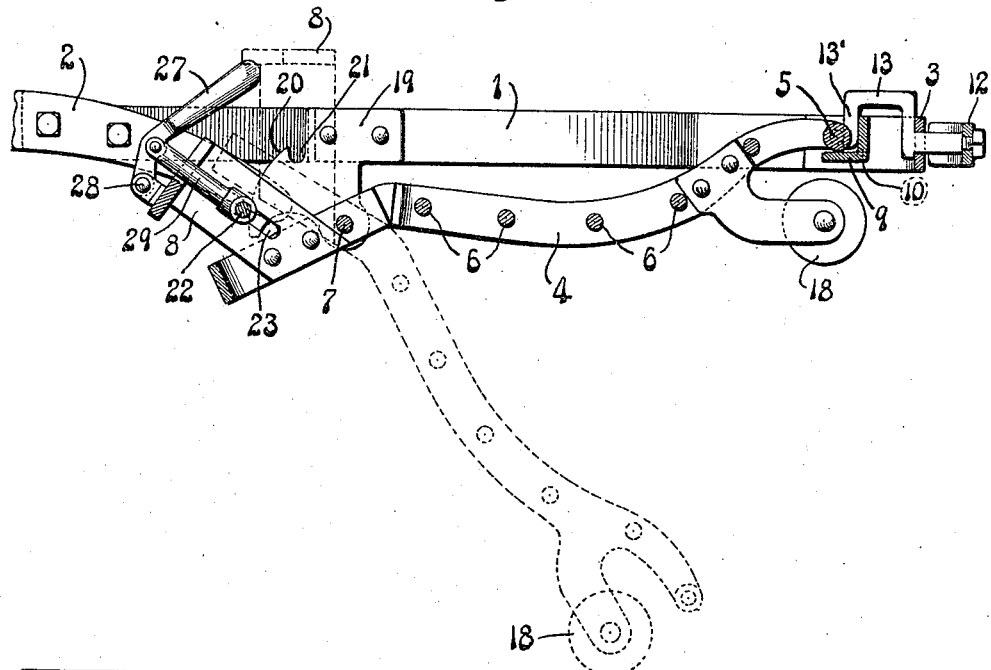
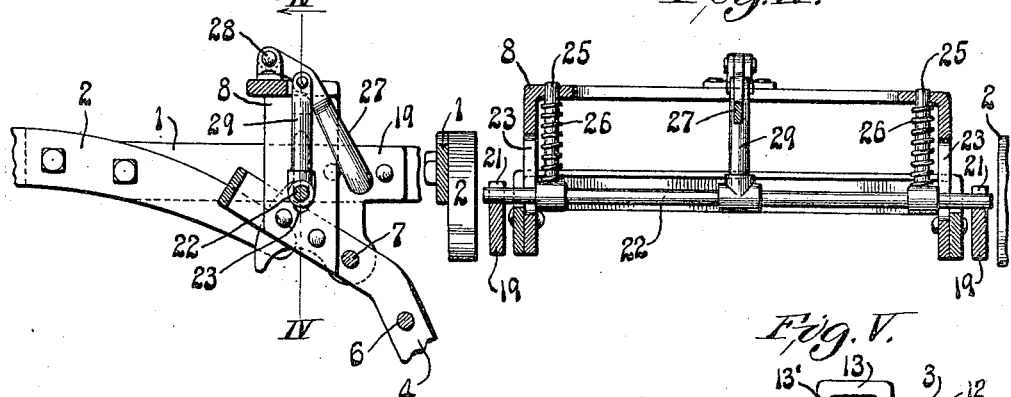
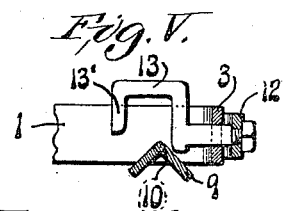

FRANK H. WILSDORF, ST. LOUIS, MISSOURI.

FENDER.

1,184,290.  Specification of Letters Patent.  Patented May 23, 1916.

Application filed January 13, 1916. Serial No. 71,887.

*To all whom it may concern:*

Be it known that I, FRANK H. WILSDORF, a citizen of the United States of America, a resident of the city of St. Louis, State of Missouri, have invented certain new and useful Improvements in Fenders, of which the following is a full, clear, and exact description, reference being had to the accompanying drawings, forming a part of this specification.

My invention relates to improvements in fenders, one of the objects being to produce a simple inexpensive and efficient tripping device for retaining the front portion of a fender in an elevated position.

Another object is to provide a strong and simple automatic latch for locking the fender in its operative position.

Figure I is a top or plan view showing my fender secured to a portion of the frame of a motor vehicle. Fig. II is a section taken approximately on the line II—II, Fig. I. Fig. III is a fragmentary view illustrating the latch device as it appears when the fender occupies its operative position. Fig. IV is a section taken approximately on the line IV—IV, Fig. III. Fig. V is a fragmentary view showing the front portion of the supporting frame and the automatic tripping device as it appears when actuated to permit the fender to drop to its operative position.

Briefly stated, the device shown in the drawings comprises a supporting frame adapted to be attached to a motor vehicle, a fender pivoted to said supporting frame, a tripping device for holding the fender in an elevated position and a latch device for locking the fender in its operative position. The supporting frame comprises a pair of diverging side bars 1, rigidly secured at their rear ends to the frame members 2 of a motor vehicle, and a front bar 3 uniting the front ends of said side bars 1. The fender is preferably a frame consisting of side bars 4, a front rod 5 connecting the front ends of said side bars 4 and a series of rods 6 secured at their ends to the side bars 4. A pivot rod 7, constituting a pivotal support for the fender, is secured to the supporting frame at points near the rear of the fender. The rear portion of the fender frame has an extension 8 adapted to receive a locking device which will hereinafter be described.

When the parts occupy the positions shown by full lines in Fig. II, the rear portion of the fender is supported by the pivot rod 7, and the front end of the fender is seated on a pivoted trip member 9. This trip member is preferably an angle bar extending across the supporting frame and provided at its ends with trunnions 10 which extend into the rigid supporting frame. These trunnions extend from the corner of the angle bar 9 so that said angle bar may move from the position shown in Fig. II to the position shown in Fig. V. The angle bar, or trip bar, is thus pivotally supported by the rigid supporting frame 1, and when held in the position shown in Fig. II it will retain the front portion of the fender in an elevated position.

12 designates a contact bar located in front of the supporting frame and provided with a pair of angular tripping fingers 13 which extend through the front bar 3 of the supporting frame. Each of these angular tripping fingers is rigidly secured to the contact bar 12 and provided with a downturned portion 13' adapted to engage the vertical leg of the angle bar 9 as shown in Figs. I and II.

14 designates guide rods (Fig. I) secured to the contact bar 12 and slidably fitted to bearings 15 on the supporting frame. Springs 16, surrounding the guide rods 14, tend to retain the contact bar in the position shown in Figs. I and II. When the contact bar 12 strikes a person, the supporting frame will move forwardly independently of said contact bar, thus locating the contact bar and its tripping fingers 13 in the positions shown in Fig. V. The pivoted angle bar, or trip bar 9, will then turn about the axis of its trunnions 10 so as to permit the fender to drop by gravity from the trip bar to the position shown by dotted lines in Fig. II. The fender is preferably provided with a pair of wheels 18 adapted to engage the ground.

19 designates latch members secured to the side bars 1 of the supporting frame, each of said latch members being provided with a curved face 20 and a notch 21 at the upper end of said curved face. A locking rod 22 carried by the fender, is slidably mounted in slots 23 formed in the fender extension 8. When the fender occupies its elevated position, the end portions of the locking rod 22 bear against the curved faces 20, and when the fender drops to its operative position these end portions enter the notches 21, thereby positively locking the fender in its operative position. Guide pins 25 secured to the locking rod 22, extend through the upper portion of the fender extension 8, as shown in Figs. I and IV.

26 designates springs surrounding said guide pins 25 and tending to force the locking rod 22 onto the curved faces 20. It will be apparent that these springs will force the locking rod into the notches 21 when the fender occupies its operative position.

27 designates an operating handle pivoted at 28, and connected to the locking rod 22 through the medium of a link 29. When locked in its operative position, the fender may be unlocked by lifting the operating handle 27 to withdraw the locking rod 22 from the notches 21.

I claim:—

1. The combination of a fender, a supporting frame to which the rear portion of said fender is pivoted, an angle bar pivoted to the front portion of said supporting frame to form a seat for the front portion of the fender when the latter occupies an elevated position, said angle bar being adapted to turn on its pivot to release the fender from said seat, thereby permitting the front portion of the fender to drop from said angle bar to its operative position, and an automatic tripping device for releasing said angle bar.

2. The combination of a fender, a supporting frame to which said fender is pivoted, a trip member pivoted to the sides of said frame and forming a hanger for the fender when the latter occupies an elevated position, said pivoted trip member being adapted to turn on its pivot so as to release the fender therefrom, thereby permitting the fender to drop to its operative position, and an automatic tripping device including a contact member in front of said supporting frame and tripping fingers secured to said contact member and slidably mounted on the front cross bar of said frame.

3. The combination of a fender, a supporting frame to which the rear portion of the fender is pivotally connected, a trip member secured to said supporting frame at its front end and forming a hanger for the front portion of the fender when the latter occupies an elevated position, a contact bar in front of said supporting frame, and tripping fingers secured to said contact bar and slidably mounted in the front cross bar of said supporting frame, said tripping fingers having downturned members adapted to retain said trip member in its operative position, and being movable in response to movements of said contact bar so as to move their downturned members out of the path of movement of said trip member, thereby permitting the fender to drop to its operative position.

4. The combination of a support provided with a notch, a fender pivoted to said support, a yieldable latch device carried by said fender and adapted to enter said notch when the fender occupies its operative position, and a tripping device for holding the fender in an elevated position.

5. The combination of a fender, a support to which said fender is pivoted, one of said parts having a pair of notches and the other being provided with a yieldable latch device adapted to enter said notches so as to positively lock the fender in its operative position, and a tripping device for holding the fender in an elevated position.

6. The combination of a fender, a support to which said fender is pivoted, said support being provided with a pair of notches, a spring pressed locking rod carried by and slidably fitted to said fender, said locking rod being adapted to enter said notches to lock the fender in its operative position, and a tripping device for holding the fender in an elevated position.

7. The combination of a fender, a support to which said fender is pivoted, said support having a pair of notches, the rear portion of said fender being extended and provided with a pair of slots, a locking rod slidably mounted in said slots, the end portions of said locking rod being adapted to register with said notches when the fender occupies its operative position, springs for forcing said locking rod into said notches, and a tripping device for holding the fender in an elevated position.

8. The combination of a fender, a support to which said fender is pivoted, said support being provided with a notch, a yieldable latch device carried by said fender and adapted to enter said notch when the fender occupies its operative position, an operating handle connected to said yieldable latch device, and a tripping device for holding the fender in an elevated position.

FRANK H. WILSDORF.

Copies of this patent may be obtained for five cents each, by addressing the "Commissioner of Patents. Washington, D. C."